US010578839B2

(12) United States Patent
Lin et al.

(10) Patent No.: US 10,578,839 B2
(45) Date of Patent: Mar. 3, 2020

(54) IMAGING LENS ASSEMBLY AND ELECTRONIC DEVICE

(71) Applicant: LARGAN PRECISION CO., LTD., Taichung (TW)

(72) Inventors: Cheng-Feng Lin, Taichung (TW); I-Wei Lai, Taichung (TW); Ming-Ta Chou, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 16/251,320

(22) Filed: Jan. 18, 2019

(65) Prior Publication Data
US 2019/0155001 A1    May 23, 2019

Related U.S. Application Data

(63) Continuation of application No. 15/201,668, filed on Jul. 5, 2016, now Pat. No. 10,234,658.

(30) Foreign Application Priority Data

May 9, 2016    (TW) .............................. 105114303 A

(51) Int. Cl.
*G02B 13/00*    (2006.01)
*G02B 1/11*    (2015.01)
(Continued)

(52) U.S. Cl.
CPC ......... *G02B 13/0055* (2013.01); *G02B 1/041* (2013.01); *G02B 1/11* (2013.01);
(Continued)

(58) Field of Classification Search
CPC ........ G02B 1/04; G02B 1/041; G02B 13/001; G02B 13/002; G02B 13/008;
(Continued)

(56) References Cited

U.S. PATENT DOCUMENTS 5,153,860 A    10/1992  Sunagawa et al.
7,391,457 B2    6/2008  Fujimoto et al.
(Continued)

FOREIGN PATENT DOCUMENTS

CN    103728705 A    4/2014
CN    204359995 U  *  5/2015  ............... G02B 9/04
(Continued)

*Primary Examiner* — William R Alexander
*Assistant Examiner* — Ephrem Z Mebrahtu
(74) *Attorney, Agent, or Firm* — McClure, Qualey & Rodack, LLP

(57) ABSTRACT

An imaging lens assembly includes a plurality of lens elements, wherein at least one of the lens elements is a dual molded lens element. The dual molded lens element includes a light transmitting portion and a light absorbing portion. The light transmitting portion includes an effective optical section. The light absorbing portion is located on at least one surface of an object-side surface and an image-side surface of the dual molded lens element, wherein a plastic material and a color of the light absorbing portion are different from a plastic material and a color of the light transmitting portion, and the light absorbing portion includes an opening. The opening is non-circular and disposed correspondingly to the effective optical section.

16 Claims, 20 Drawing Sheets

(51) Int. Cl.
*G02B 1/04* (2006.01)
*G02B 5/00* (2006.01)
*G02B 7/02* (2006.01)

(52) U.S. Cl.
CPC ............. *G02B 5/003* (2013.01); *G02B 5/005* (2013.01); *G02B 7/025* (2013.01); *G02B 13/002* (2013.01)

(58) Field of Classification Search
CPC .. G02B 13/0045; G02B 13/0055; G02B 1/11; G02B 7/021; G02B 7/025; G02B 3/0031; G02B 3/0068; B29D 11/00009; B29D 11/00298; B29C 45/03; B29C 45/14; B29C 45/16; B29C 2045/167
USPC .......................................... 359/642, 738–740
See application file for complete search history.

(56) References Cited

U.S. PATENT DOCUMENTS

| | | | |
|---|---|---|---|
| 8,031,412 B2 | 10/2011 | Shintani | |
| 8,102,609 B2 | 1/2012 | Tsuchiya et al. | |
| 8,455,810 B2 | 6/2013 | Tomioka et al. | |
| 8,736,989 B2 | 5/2014 | Wu | |
| 8,817,396 B2 | 8/2014 | Mori et al. | |
| 8,947,795 B2 | 2/2015 | Kobayashi et al. | |
| 8,964,313 B2 | 2/2015 | Kobayashi et al. | |
| 8,964,314 B2 | 2/2015 | Koike et al. | |
| 8,985,789 B2 | 3/2015 | Cho et al. | |
| 9,158,037 B2 | 10/2015 | Otsuka et al. | |
| 9,513,454 B2 | 12/2016 | Lin et al. | |
| 2004/0263994 A1 | 12/2004 | Sayag | |
| 2009/0185291 A1* | 7/2009 | Tsuchiya | G02B 7/021 359/738 |
| 2014/0204478 A1 | 7/2014 | Asami et al. | |
| 2014/0334019 A1 | 11/2014 | Ishiguri et al. | |
| 2014/0347752 A1 | 11/2014 | Koike et al. | |
| 2015/0103407 A1* | 4/2015 | Chen | G02B 1/11 359/601 |
| 2015/0323757 A1* | 11/2015 | Bone | G02B 3/02 359/819 |
| 2016/0139359 A1* | 5/2016 | Lin | G02B 9/04 359/793 |

FOREIGN PATENT DOCUMENTS

| | | |
|---|---|---|
| CN | 204359995 U | 5/2015 |
| TW | 201416788 A | 5/2014 |
| TW | 201423249 A | 6/2014 |
| TW | 201516480 A | 5/2015 |
| TW | 201543100 A | 11/2015 |

* cited by examiner

IMAGING LENS ASSEMBLY AND ELECTRONIC DEVICE

RELATED APPLICATIONS

The present application is a continuation of the application Ser. No. 15/201,668, filed Jul. 5, 2016, now U.S. Pat. No. 10,234,658, which claims priority to Taiwan Application Serial Number 105114303, filed May 9, 2016, which is herein incorporated by reference.

BACKGROUND

Technical Field

The present disclosure relates to an imaging lens assembly. More particularly, the present disclosure relates to a compact imaging lens assembly which is applicable to electronic devices.

Description of Related Art

Due to the popularity of personal electronic products and mobile communication products having camera functionalities, such as smart phones and tablet personal computers, the demand for compact imaging lens assemblies has been increasing and the requirements for high resolution and image quality of present compact imaging lens assemblies increase significantly.

A plastic lens element is generally used to effectively reduce the manufacturing cost of the imaging lens assembly. A conventional plastic lens element is typically formed by an injection molding method and has a smooth and bright surface, which is featured with high reflectivity. Accordingly, when the stray light is reflected from the surfaces of other optical elements of the imaging lens assembly to the surface of the plastic lens element, the stray light reflected from the surface of the plastic lens element cannot be effectively attenuated and would be incident on the surfaces of lens elements of the imaging lens assembly.

Hence, how to meet the requirements of suppressing the stray light of the compact imaging lens assemblies has become one of the important subjects, so that the image quality of the compact imaging lens assemblies can be enhanced, and the requirements of high-end optical systems with camera functionalities can be satisfied.

SUMMARY

According to one aspect of the present disclosure, an imaging lens assembly includes a plurality of lens elements, wherein at least one of the lens elements is a dual molded lens element. The dual molded lens element includes a light transmitting portion and a light absorbing portion. The light transmitting portion includes an effective optical section. The light absorbing portion is located on at least one surface of an object-side surface and an image-side surface of the dual molded lens element, wherein a plastic material and a color of the light absorbing portion are different from a plastic material and a color of the light transmitting portion, and the light absorbing portion includes an opening. The opening is non-circular and disposed correspondingly to the effective optical section. When a minimum distance through an optical axis of the opening is $\psi Bmin$, and a maximum outer diameter of the light transmitting portion is $\psi L$, the following condition is satisfied: $0.20 < \psi Bmin/\psi L < 0.75$.

According to another aspect of the present disclosure, an electronic device includes an imaging lens module, wherein the imaging lens module includes the imaging lens assembly according to the foregoing aspect and an image sensor. The image sensor is disposed on an image surface of the imaging lens assembly.

According to another aspect of the present disclosure, an imaging lens assembly includes a plurality of lens elements, wherein at least one of the lens elements is a dual molded lens element. The dual molded lens element includes a light transmitting portion and a light absorbing portion. The light transmitting portion includes an effective optical section, wherein a part of the effective optical section located on at least one surface of an object-side surface and an image-side surface of the dual molded lens element includes a non-circular outer edge. The light absorbing portion is located on the surface of the object-side surface and the image-side surface of the dual molded lens element, wherein a plastic material and a color of the light absorbing portion are different from a plastic material and a color of the light transmitting portion, and the light absorbing portion includes an opening. The opening is disposed correspondingly to the non-circular outer edge of the effective optical section. When a minimum distance through an optical axis of the non-circular outer edge is $\psi Wmin$, and a maximum distance through the optical axis of the non-circular outer edge is $\psi Wmax$, the following condition is satisfied: $0.35 < \psi Wmin/\psi Wmax < 0.75$.

According to another aspect of the present disclosure, an electronic device includes an imaging lens module, wherein the imaging lens module includes the imaging lens assembly according to the foregoing aspect and an image sensor. The image sensor is disposed on an image surface of the imaging lens assembly.

DETAILED DESCRIPTION

1st Embodiment

Figure 1A:
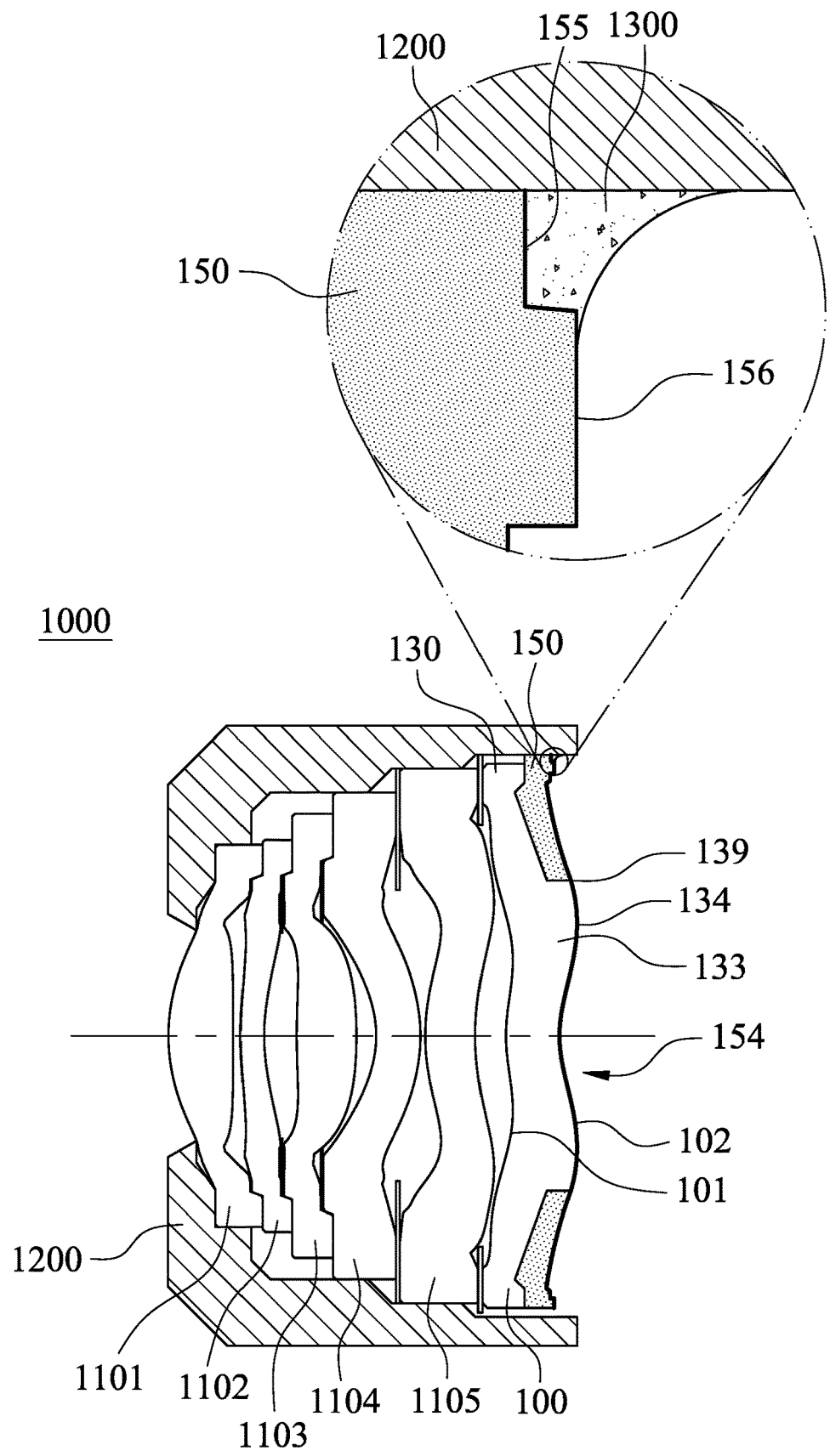
FIG. 1A is a schematic view of an imaging lens assembly according to the 1st embodiment of the present disclosure.

FIG. 1A is a schematic view of an imaging lens assembly 1000 according to the 1st embodiment of the present disclosure. In FIG. 1A, the imaging lens assembly 1000 includes a plurality of lens elements, wherein one of the lens elements is a dual molded lens element 100. In other embodiments (not shown herein), an imaging lens assembly can include two or more dual molded lens elements.

Figure 1B:
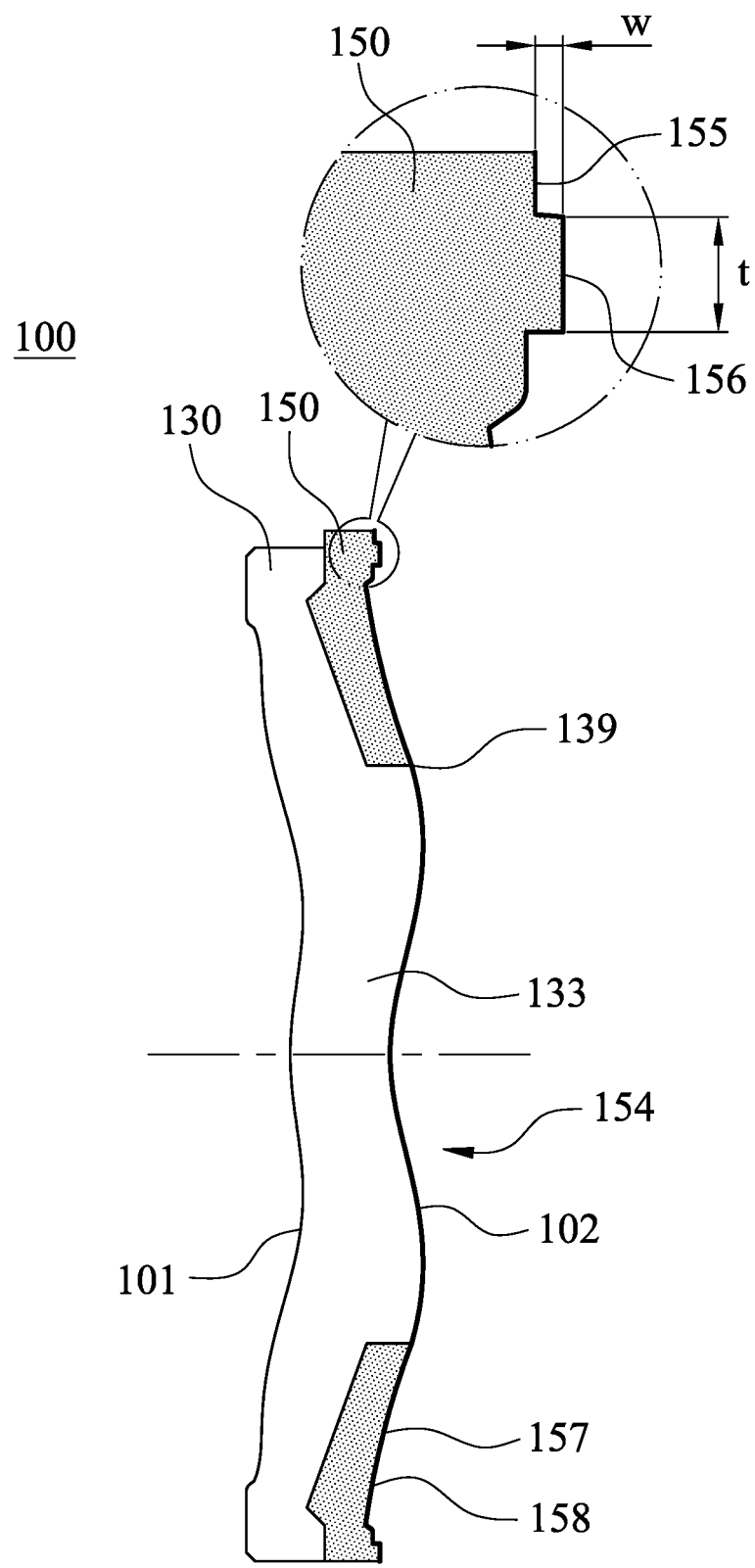
FIG. 1B is a schematic view of a dual molded lens element according to the 1st embodiment.

FIG. 1B is a schematic view of the dual molded lens element 100 according to the 1st embodiment. In FIG. 1A and FIG. 1B, the dual molded lens element 100 includes a light transmitting portion 130 and a light absorbing portion 150, wherein the light transmitting portion 130 and the light absorbing portion 150 of the dual molded lens element 100 are formed by a dual-shot injection molding method or a dual-shot molding method.

The light transmitting portion 130 includes an effective optical section 133, wherein an incident light passes through the effective optical section 133 and forms the image on an image surface (not shown herein). Each surface of the effective optical section 133 can be a planar surface or a surface being aspheric with any curvature, wherein blocking the effective optical section 133 would affect imaging properties.

Figure 1C:
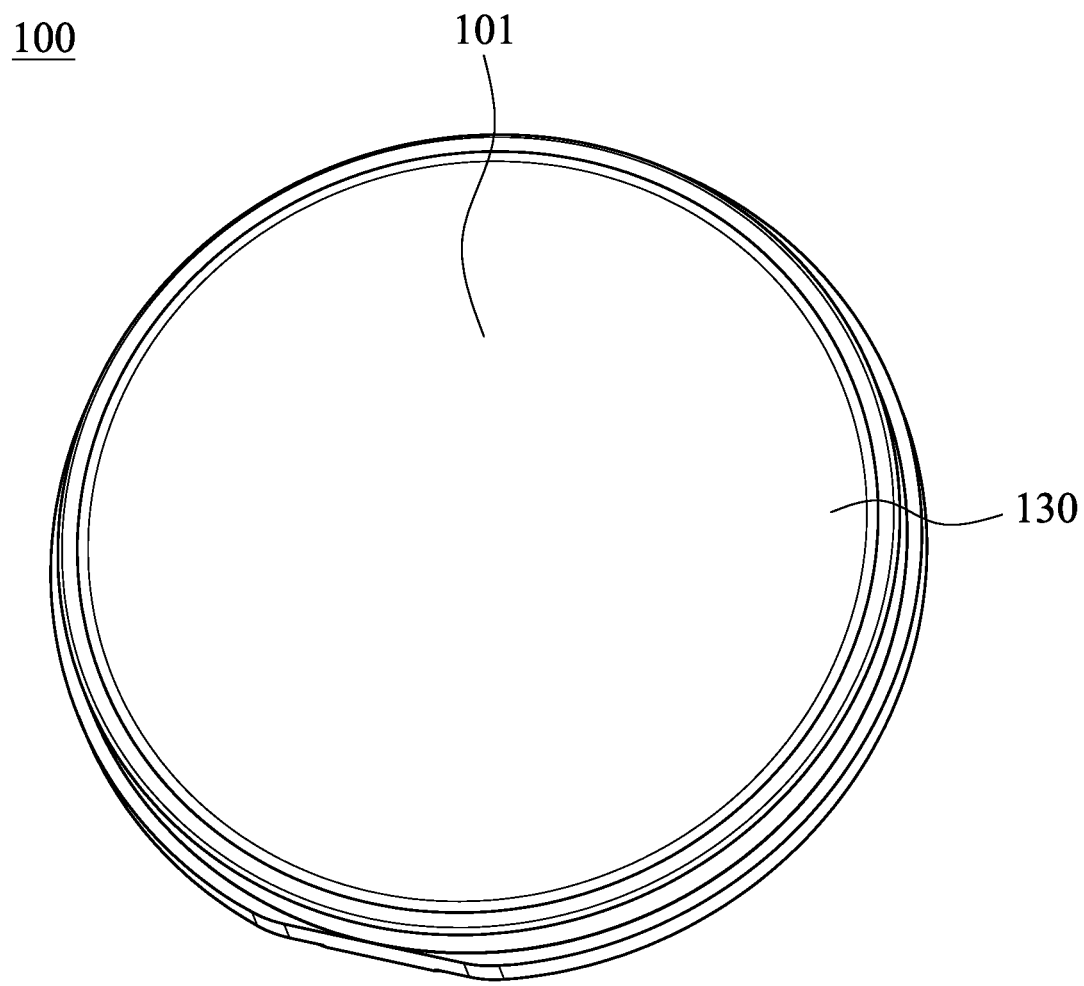
FIG. 1C is a three-dimensional view of the dual molded lens element according to the 1st embodiment.
Figure 1D:
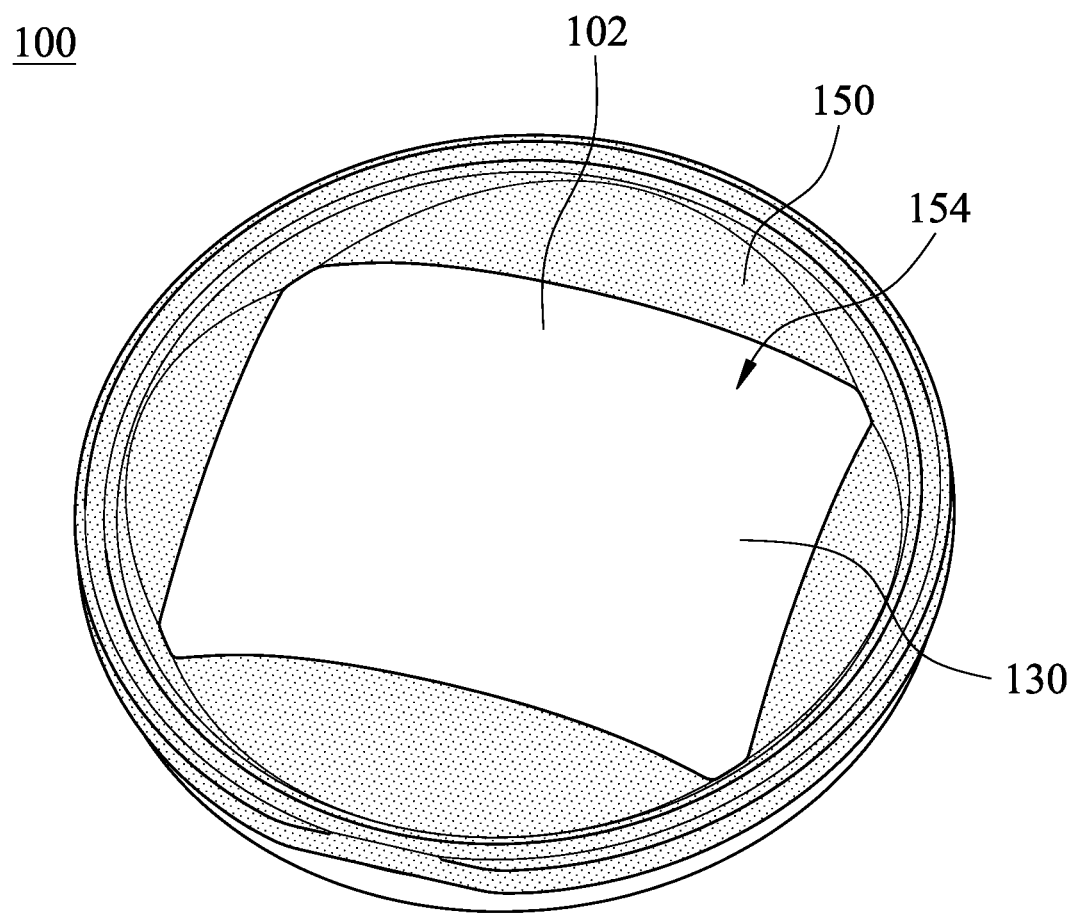
FIG. 1D is another three-dimensional view of the dual molded lens element according to the 1st embodiment.

FIG. 1C is a three-dimensional view of the dual molded lens element 100 according to the 1st embodiment, and FIG. 1D is another three-dimensional view of the dual molded lens element 100 according to the 1st embodiment. In FIG. 1A to FIG. 1D, the light absorbing portion 150 is located on one surface of an object-side surface 101 and an image-side surface 102 of the dual molded lens element 100 (the aforementioned surface is the image-side surface 102 in the 1st embodiment), wherein a plastic material and a color of the light absorbing portion 150 are different from a plastic material and a color of the light transmitting portion 130. In the 1st embodiment, the plastic material of the light absorbing portion 150 has the feature of absorbing visible light, and the color of the light absorbing portion 150 is black. The plastic material of the light transmitting portion 130 has the feature of being transmitted by visible light, and the color of the light transmitting portion 130 is transparent and colorless. Hence, the plastic material and the color of the light absorbing portion 150 are different from the plastic material and the color of the light transmitting portion 130. In other embodiments (not shown herein), a light absorbing portion can be located on an object-side surface of a dual molded lens element, or both of the object-side surface and an image-side surface of the dual molded lens element.

The light absorbing portion 150 includes an opening 154. The opening 154 is disposed correspondingly to the effective optical section 133, so that the incident light could pass through the effective optical section 133 and forms the image on the image surface. Therefore, it is favorable for suppressing the stray light so as to enhance the image quality of the imaging lens assembly 1000.

Figure 1E:
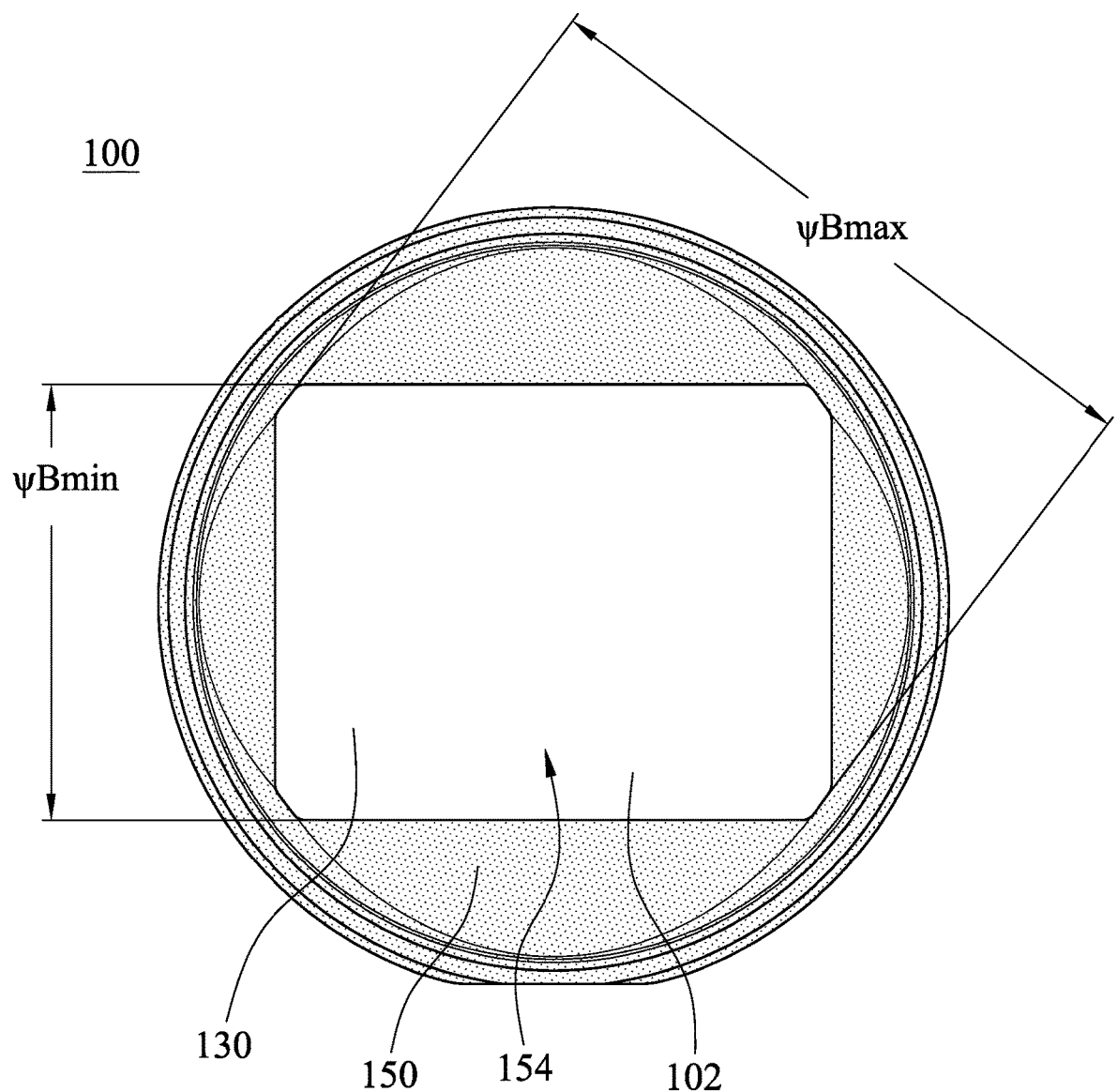
FIG. 1E is a top view of the dual molded lens element according to FIG. 1D.

In detail, FIG. 1E is a top view of the dual molded lens element 100 according to FIG. 1D. In FIG. 1E, the opening 154 of the light absorbing portion 150 can be non-circular. Therefore, it is favorable for improving the manufacturing yield rate of the dual molded lens element 100.

Figure 1F:
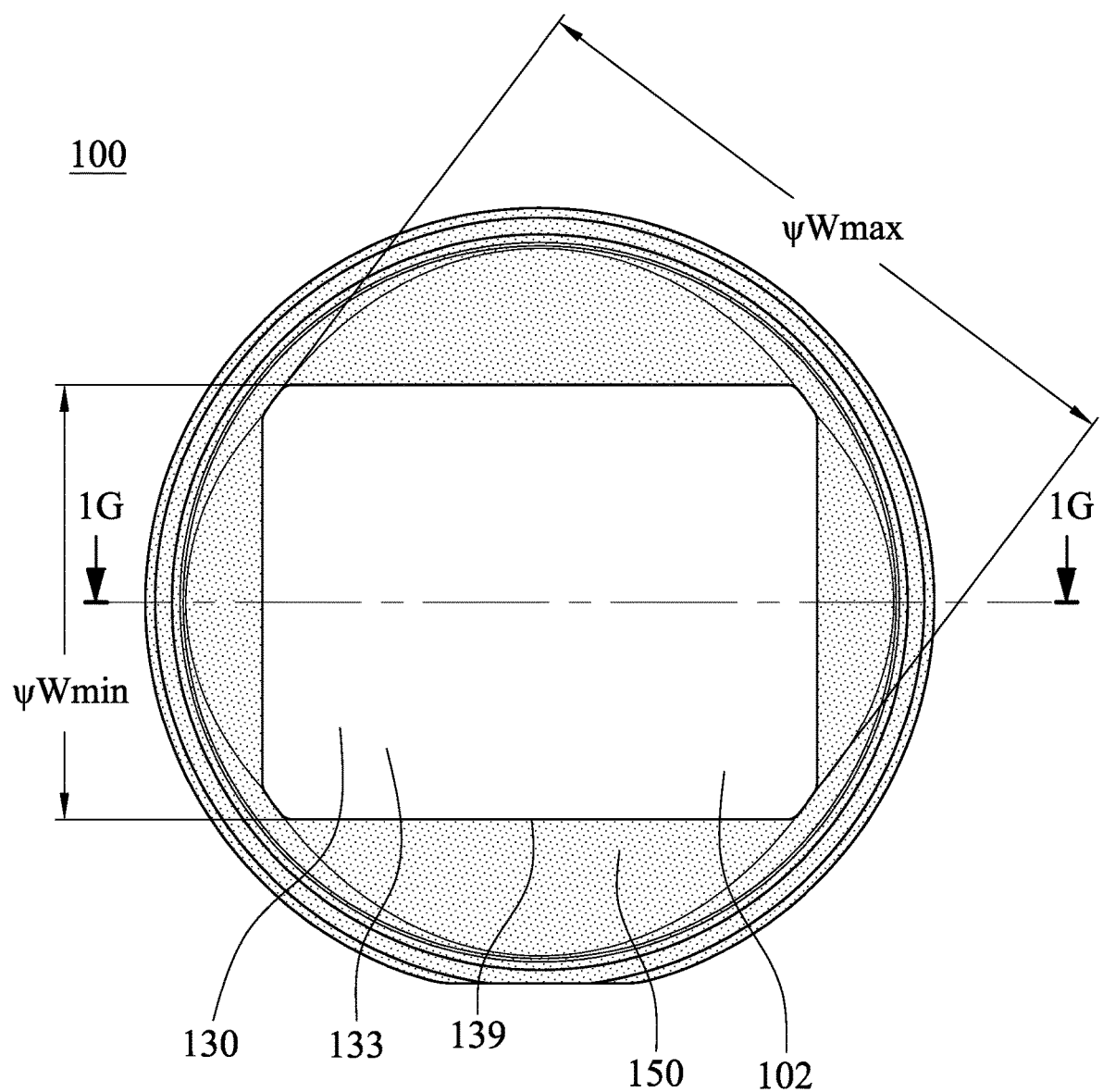
FIG. 1F is another top view of the dual molded lens element according to FIG. 1D.

FIG. 1F is another top view of the dual molded lens element 100 according to FIG. 1D. In FIG. 1F, a part of the effective optical section 133 located on the image-side surface 102 of the dual molded lens element 100 can include a non-circular outer edge 139. Therefore, the shape design of the non-circular outer edge 139 of the effective optical section 133 can meet the molding requirements of the dual molded lens element 100.

In FIG. 1B, FIG. 1E and FIG. 1F, the opening 154 of the light absorbing portion 150 can be disposed correspondingly to the non-circular outer edge 139 of the effective optical section 133. That is, an area enclosed by the non-circular outer edge 139 can be completely overlapped by an area of the opening 154, or the area enclosed by the non-circular outer edge 139 can be inside the area of the opening 154. In the 1st embodiment, the area enclosed by the non-circular outer edge 139 is completely overlapped by the area of the opening 154.

Figure 1G:
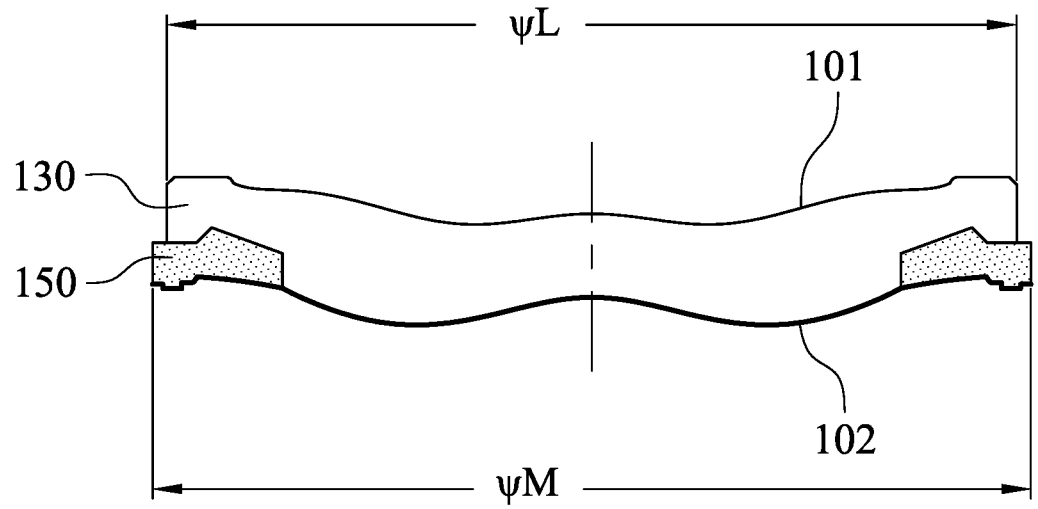
FIG. 1G is a cross-sectional view along line 1G-1G of FIG. 1F.

FIG. 1G is a cross-sectional view along line 1G-1G of FIG. 1F. In FIG. 1E and FIG. 1G, when a minimum distance through an optical axis of the opening 154 is ψBmin, and a maximum outer diameter of the light transmitting portion 130 is ψL, the following condition can be satisfied: 0.20<ψBmin/ψL<0.75. Therefore, it is favorable for further suppressing the stray light so as to enhance the image quality of the imaging lens assembly 1000.

In FIG. 1F, when a minimum distance through the optical axis of the non-circular outer edge 139 is ψWmin, and a maximum distance through the optical axis of the non-circular outer edge 139 is ψWmax, the following condition can be satisfied: 0.35<ψWmin/ψWmax<0.75. Therefore, it is favorable for the mold design of the dual molded lens element 100 by the specific non-circular features of the non-circular outer edge 139.

Furthermore, in FIG. 1A, when a number of the lens elements of the imaging lens assembly 1000 is N, the following condition can be satisfied: 5≤N<10. Therefore, it is favorable for satisfying more photographing requirements of the imaging lens assembly 1000. In the 1st embodiment, the imaging lens assembly 1000 includes, in order from an object side to an image side, the lens elements 1101, 1102, 1103, 1104, 1105 and the dual molded lens element 100. The imaging lens assembly 1000 has a total of six lens elements. In other embodiments (not shown herein), the imaging lens assembly can have a total of five, seven, eight or more lens elements. Furthermore, the imaging lens assembly 1000 can further include a barrel 1200, wherein the six lens elements of the imaging lens assembly 1000 can be disposed in the barrel 1200 so as to block a lot of stray light. It is favorable for avoiding the stray light entering the portions of the lens element other than the effective optical section and preventing from unnecessary reflection among the lens elements.

The dual molded lens element 100 can be closest to the image surface among the lens elements of the imaging lens assembly 1000. Therefore, it is favorable for effectively blocking stray light among the lens elements. In the 1st embodiment, the dual molded lens element 100 is closest to the image surface among the lens elements of the imaging lens assembly 1000.

The imaging lens assembly 1000 can further include a glue material 1300 connected to the light absorbing portion 150 of the dual molded lens element 100. Therefore, it is favorable for increasing the structural stability of the imaging lens assembly 1000. In the 1st embodiment, the glue material 1300 connects the light absorbing portion 150 and the barrel 1200.

The light transmitting portion 130 and the light absorbing portion 150 can be formed by the dual-shot injection molding method. Therefore, it is favorable for reducing process steps so as to improve the production efficiency of the dual molded lens element 100.

In FIG. 1G, when the maximum outer diameter of the light transmitting portion 130 is ψL, and a maximum outer diameter of the light absorbing portion 150 is ψM, the following condition can be satisfied: ψL<ψM. Therefore, it is favorable for enlarging the range of blocking stray light of the imaging lens assembly 1000.

In FIG. 1A, the part of the effective optical section 133 located on the image-side surface 102 of the dual molded lens element 100 can be aspheric. Therefore, it is favorable for reducing aberrations.

The part of the effective optical section 133 located on the image-side surface 102 of the dual molded lens element 100 can include at least one inflection point. Therefore, it is favorable for effectively correcting the off-axial aberrations so as to enhance the image quality in an off-axial region. In the 1st embodiment, the part of the effective optical section 133 located on the image-side surface 102 of the dual molded lens element 100 includes at least one inflection point, wherein the image-side surface 102 is concave in a paraxial region thereof.

In the 1st embodiment, the light absorbing portion 150 is located on the image-side surface 102 of the dual molded lens element 100, and a point 134 closest to the image surface of the effective optical section 133 can be closer to the image surface than the light absorbing portion 150. Therefore, it is favorable for obtaining a light blocking design suitable for the compact size, and balancing the light blocking efficiency and the compact size.

In FIG. 1E, the opening 154 of the light absorbing portion 150 can be polygon. Therefore, it is favorable for increasing the contact area between the light transmitting portion 130 and the light absorbing portion 150 so as to improve the manufacturing yield rate of the dual molded lens element 100. In the 1st embodiment, the opening 154 is polygon.

When a number of sides of the opening 154 is m, the following condition can be satisfied: 3<m<13. Therefore, it is favorable for simultaneously maintaining the image quality and the molding yield rate of the dual molded lens element 100. In the 1st embodiment, the number of sides of the opening 154 is eight. That is, the opening 154 is octagon.

When the minimum distance through the optical axis of the opening 154 is ψBmin, and a maximum distance through the optical axis of the opening 154 is ψBmax, the following condition can be satisfied: 0.35<ψBmin/ψBmax<0.75. Therefore, it is favorable for not only maintaining the optical specifications, but also obtaining a better light blocking efficiency of the imaging lens assembly 1000.

In FIG. 1A and FIG. 1B, the light absorbing portion 150 can further include a ring-shaped recess structure 155, which is recessed along a direction parallel to the optical axis from a surface of the light absorbing portion 150. Therefore, the ring-shaped recess structure 155 can be used as an accommodating groove of the glue material 1300 so as to prevent the glue material 1300 from overflowing. In the 1st embodiment, the light absorbing portion 150 further includes the ring-shaped recess structure 155. The ring-shaped recess structure 155 is recessed along the direction parallel to the optical axis from the surface of the light absorbing portion 150, which is located on the image-side surface 102 of the dual molded lens element 100. The ring-shaped recess structure 155 is adjacent to the barrel 1200, so that the glue material 1300 could connect the light absorbing portion 150 and the barrel 1200.

When a depth parallel to the optical axis of the ring-shaped recess structure 155 is w, the following condition can be satisfied: 0.015 mm<w<0.35 mm. Therefore, it is favorable for obtaining a proper depth of the ring-shaped recess structure 155, which is close to the outer edge of the dual molded lens element 100, so as to improve the fixing stability of the dual molded lens element 100.

The light absorbing portion 150 can further include a ring-shaped protrusion structure 156 surrounding the opening 154. Therefore, it is favorable for controlling the range of the glue material 1300. In the 1st embodiment, the light absorbing portion 150 further includes the ring-shaped protrusion structure 156 surrounding the opening 154, wherein the ring-shaped protrusion structure 156 is adjacent to the ring-shaped recess structure 155, and closer to the optical axis than the ring-shaped recess structure 155.

When a width along a radial direction of the optical axis of the ring-shaped protrusion structure 156 is t, the following condition can be satisfied: 0.04 mm<t<0.80 mm. Therefore, it is favorable for preventing the glue material 1300 from overflowing.

The light absorbing portion 150 can further include a rough surface 157, which is not in contact with the light transmitting portion 130. That is, the rough surface 157 can be located on part or all area of a surface of the light absorbing portion 150, which is not connected to the light transmitting portion 130. Therefore, it is favorable for reducing the surface reflection of the dual molded lens element 100. In the 1st embodiment, the rough surface 157 is located on part area of a surface of the light absorbing portion 150, which is located on the image-side surface 102 of the dual molded lens element 100. Furthermore, the rough surface 157 is transferred from the machining properties of the mold surfaces during the injection molding process of the dual molded lens element 100, wherein the machining properties can be electrical discharge machining (EDM), sand blasting, laser related etching and the like. The rough surface 157 could be used to decrease the gloss level of the surface of the dual molded lens element 100 so as to reduce the impact from the stray light and enhance the image quality.

The light absorbing portion 150 can further include an anti-reflection coating 158 coated on at least part of a surface of the light absorbing portion 150, which is not in contact with the light transmitting portion 130. That is, the anti-reflection coating 158 can be coated on part or all area of the surface of the light absorbing portion 150, which is not connected to the light transmitting portion 130. The anti-reflection coating 158 can be coated on a surface of the light absorbing portion 150, which is located on the image-side surface 102. Therefore, it is favorable for reducing the surface reflection of the dual molded lens element 100. In addition, another anti-reflection coating (its reference numeral is omitted) can be coated on a surface of the light transmitting portion 130, which is located on the image-side surface 102. In the 1st embodiment, the anti-reflection coating 158 is coated on all area of the surface of the light absorbing portion 150, which is located on the image-side surface 102 of the dual molded lens element 100. Furthermore, the anti-reflection coating 158 can be multilayers of Silicon dioxide (SiO₂) and multilayers of Titanium dioxide (TiO₂) deposited and interactively stacked on the surface of the light absorbing portion 150, wherein the material, the number of layers and the stack type of the anti-reflection coating 158 can be adjusted as needed.

The data of the aforementioned parameters of the imaging lens assembly 1000 according to the 1st embodiment of the present disclosure are listed in the following Table 1, wherein the parameters are also shown as FIG. 1B, FIG. 1E to FIG. 1G.

TABLE 1

1st Embodiment

| | | | |
|---|---|---|---|
| m | 8 | ψBmin (mm) | 3.25 |
| N | 6 | ψL (mm) | 5.70 |
| t (mm) | 0.12 | ψM (mm) | 5.89 |
| w (mm) | 0.03 | ψWmax (mm) | 5.00 |
| ψBmax (mm) | 5.00 | ψWmin (mm) | 3.25 |
| ψBmin/ψBmax | 0.65 | ψWmin/ψWmax | 0.65 |
| ψBmin/ψL | 0.57 | | |

2nd Embodiment

Figure 2A:
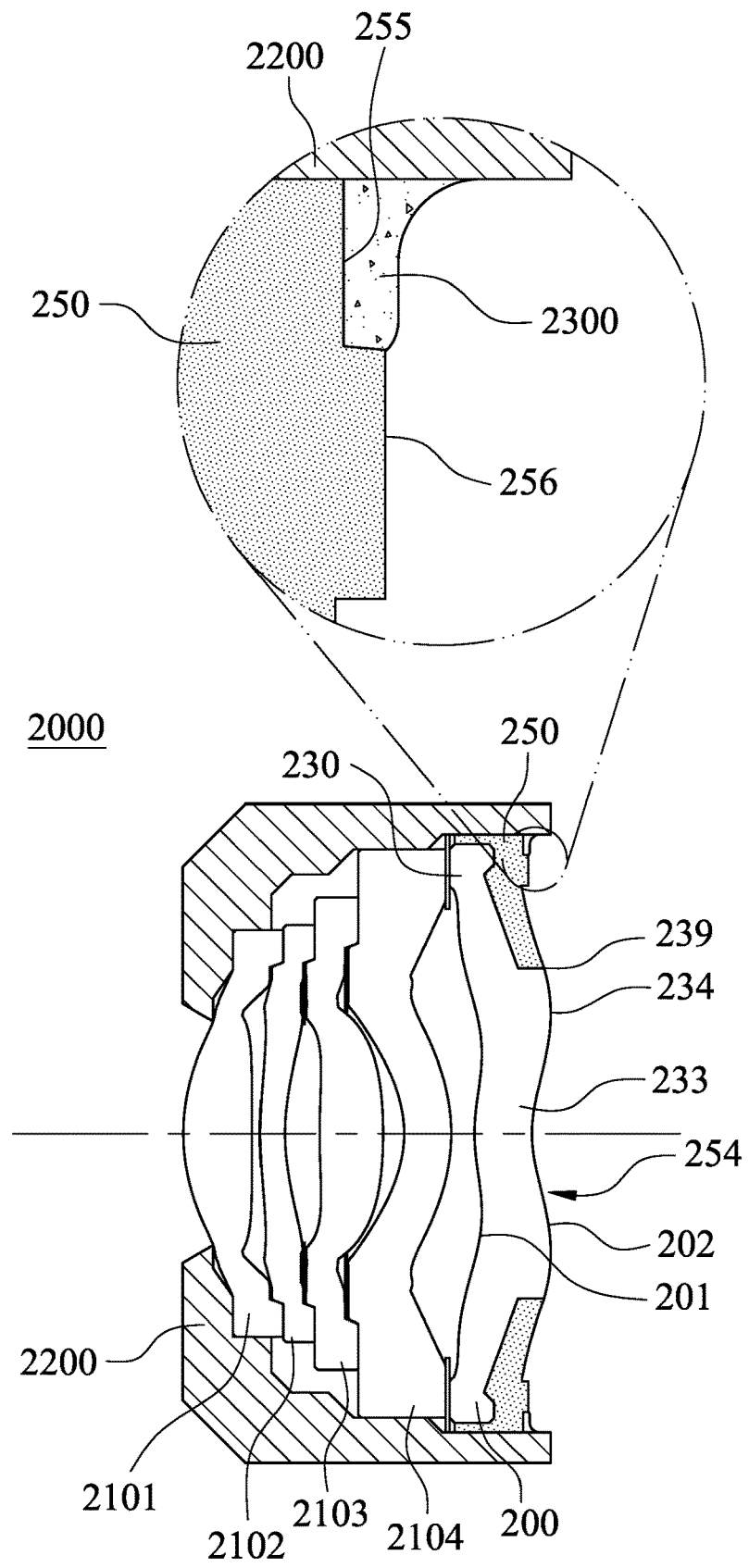
FIG. 2A is a schematic view of an imaging lens assembly according to the 2nd embodiment of the present disclosure.

FIG. 2A is a schematic view of an imaging lens assembly 2000 according to the 2nd embodiment of the present disclosure. In FIG. 2A, the imaging lens assembly 2000 includes a plurality of lens elements, wherein one of the lens elements is a dual molded lens element 200.

Figure 2B:
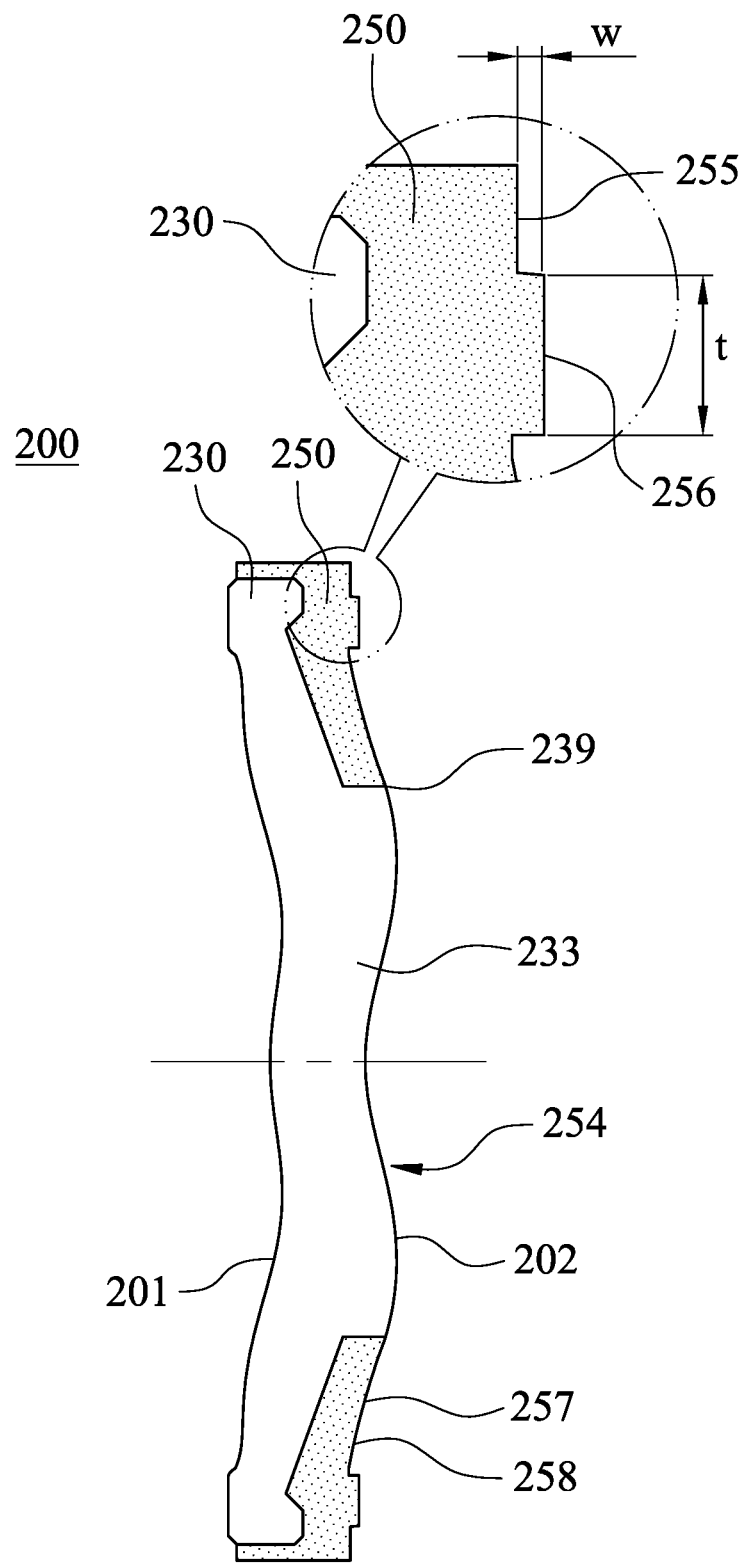
FIG. 2B is a schematic view of a dual molded lens element according to the 2nd embodiment.

FIG. 2B is a schematic view of the dual molded lens element 200 according to the 2nd embodiment. In FIG. 2A and FIG. 2B, the dual molded lens element 200 includes a light transmitting portion 230 and a light absorbing portion 250, wherein the light transmitting portion 230 and the light absorbing portion 250 of the dual molded lens element 200 are formed by a dual-shot injection molding method.

The light transmitting portion 230 includes an effective optical section 233, wherein an incident light passes through the effective optical section 233 and forms the image on an image surface (not shown herein).

The light absorbing portion 250 is located on one surface of an object-side surface 201 and an image-side surface 202 of the dual molded lens element 200 (the aforementioned surface is the image-side surface 202 in the 2nd embodiment). The plastic material of the light absorbing portion 250 has the feature of absorbing visible light, and the color of the light absorbing portion 250 is black. The plastic material of the light transmitting portion 230 has the feature of being transmitted by visible light, and the color of the light transmitting portion 230 is transparent and colorless. Hence, the plastic material and the color of the light absorbing portion 250 are different from the plastic material and the color of the light transmitting portion 230. The light absorbing portion 250 includes an opening 254, wherein the opening 254 is disposed correspondingly to the effective optical section 233.

Figure 2C:
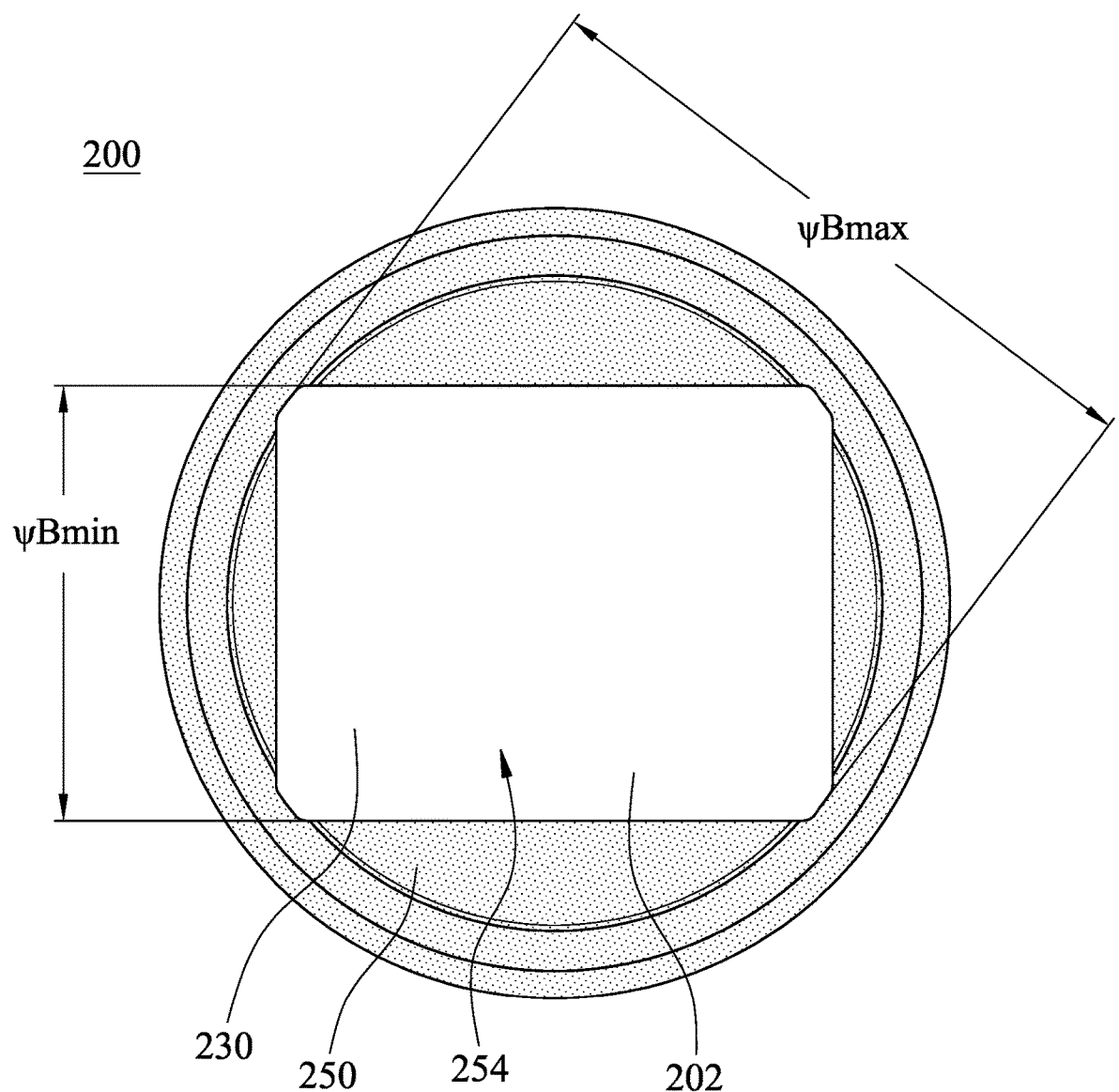
FIG. 2C is a top view of the dual molded lens element according to the 2nd embodiment.
Figure 2D:
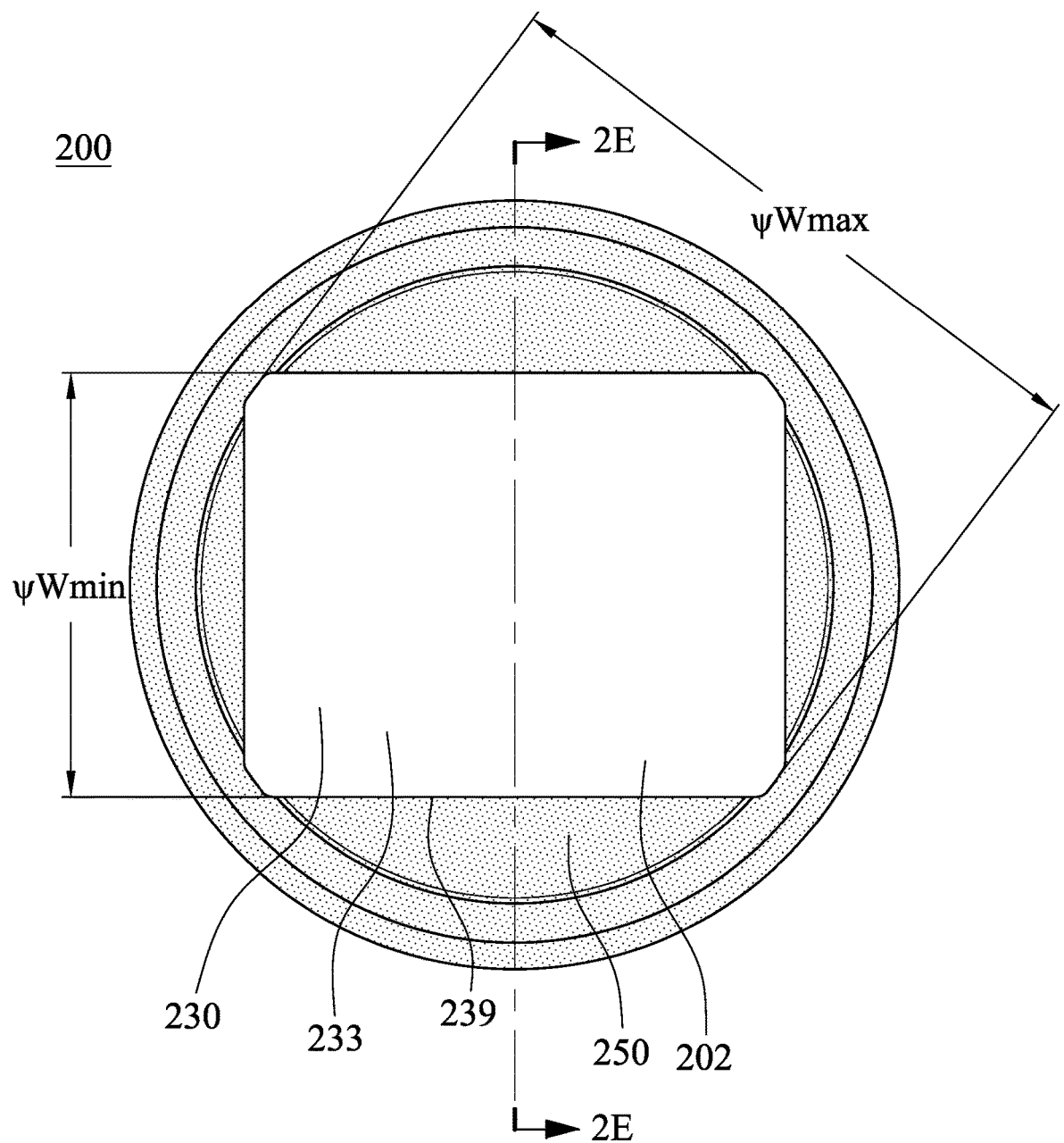
FIG. 2D is another top view of the dual molded lens element according to the 2nd embodiment.

In detail, FIG. 2C is a top view of the dual molded lens element 200 according to the 2nd embodiment, and FIG. 2D is another top view of the dual molded lens element 200 according to the 2nd embodiment. In FIG. 2C and FIG. 2D, the opening 254 of the light absorbing portion 250 is non-circular. The opening 254 is polygon. A number of sides of the opening 254 is eight. That is, the opening 254 is octagon.

A part of the effective optical section 233 located on the image-side surface 202 of the dual molded lens element 200 includes a non-circular outer edge 239. The opening 254 of the light absorbing portion 250 is disposed correspondingly to the non-circular outer edge 239 of the effective optical section 233, wherein an area enclosed by the non-circular outer edge 239 is completely overlapped by an area of the opening 254.

In FIG. 2A and FIG. 2B, the part of the effective optical section 233 located on the image-side surface 202 of the dual molded lens element 200 is aspheric. The part of the effective optical section 233 located on the image-side surface 202 of the dual molded lens element 200 includes at least one inflection point, wherein the image-side surface 202 is concave in a paraxial region thereof. The light absorbing portion 250 is located on the image-side surface 202 of the dual molded lens element 200, and a point 234 closest to the image surface of the effective optical section 233 is closer to the image surface than the light absorbing portion 250.

The imaging lens assembly 2000 includes, in order from an object side to an image side, the lens elements 2101, 2102, 2103, 2104 and the dual molded lens element 200. The imaging lens assembly 2000 has a total of five lens elements. The dual molded lens element 200 is closest to the image surface among the lens elements of the imaging lens assembly 2000.

The imaging lens assembly 2000 further includes a glue material 2300 connecting the light absorbing portion 250 and a barrel 2200. The light absorbing portion 250 further includes the ring-shaped recess structure 255 surrounding the opening 254. The ring-shaped recess structure 255 is recessed along a direction parallel to an optical axis from a surface of the light absorbing portion 250, which is located on the image-side surface 202 of the dual molded lens element 200. The ring-shaped recess structure 255 is adjacent to the barrel 2200, so that the glue material 2300 could connect the light absorbing portion 250 and the barrel 2200. The light absorbing portion 250 further includes the ring-shaped protrusion structure 256 surrounding the opening 254, wherein the ring-shaped protrusion structure 256 is adjacent to the ring-shaped recess structure 255, and closer to the optical axis than the ring-shaped recess structure 255.

The light absorbing portion 250 further includes a rough surface 257, which is not in contact with the light transmitting portion 230. The light absorbing portion 250 further includes an anti-reflection coating 258 (not shown with a bold line as the anti-reflection coating 158 in the 1st embodiment). The anti-reflection coating 258 is coated on part area of a surface of the light absorbing portion 250, which is not in contact with the light transmitting portion 230.

Figure 2E:
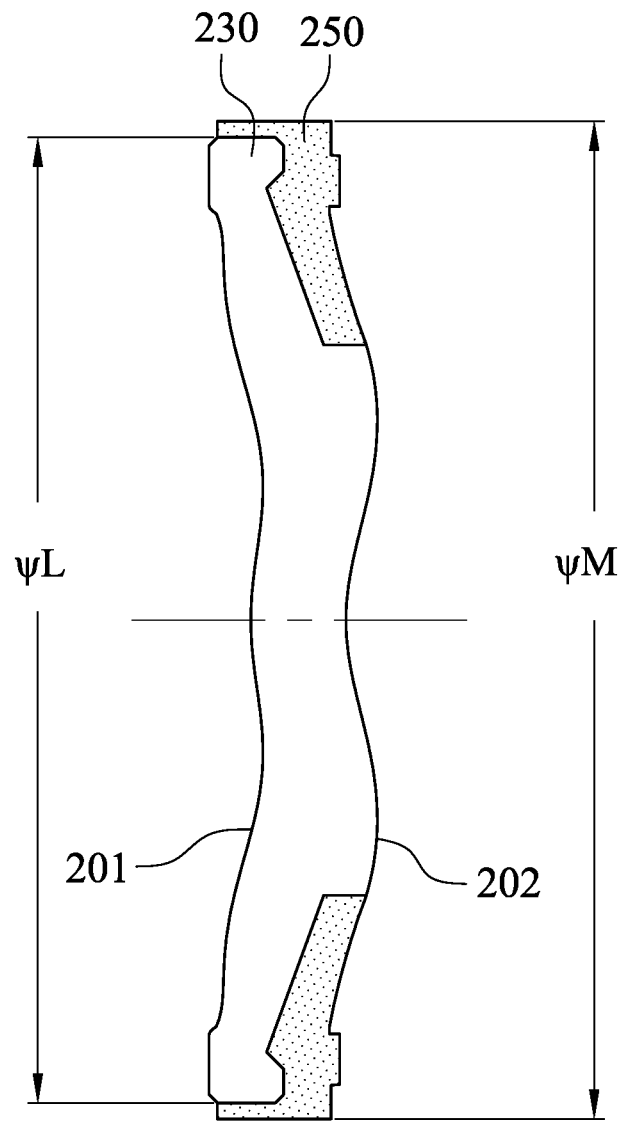
FIG. 2E is a cross-sectional view along line 2E-2E of FIG. 2D.

FIG. 2E is a cross-sectional view along line 2E-2E of FIG. 2D. The data of the parameters m, N, t, w, ψBmax, ψBmin, ψL, ψM, ψWmax, ψWmin, ψBmin/ψBmax, ψBmin/ψL and ψWmin/ψWmax of the imaging lens assembly 2000 according to the 2nd embodiment of the present disclosure are listed in the following Table 2, wherein the parameters are also shown as FIG. 2B to FIG. 2E. The definitions of these parameters shown in Table 2 are the same as those stated in the 1st embodiment with corresponding values for the 2nd embodiment.

TABLE 2

2nd Embodiment

| | | | |
|---|---|---|---|
| m | 8 | ψBmin (mm) | 3.25 |
| N | 5 | ψL (mm) | 5.70 |
| t (mm) | 0.3 | ψM (mm) | 5.89 |

TABLE 2-continued

2nd Embodiment

| w (mm) | 0.05 | ψWmax (mm) | 5.00 |
|---|---|---|---|
| ψBmax (mm) | 5.00 | ψWmin (mm) | 3.25 |
| ψBmin/ψBmax | 0.65 | ψWmin/ψWmax | 0.65 |
| ψBmin/ψL | 0.57 | | |

3rd Embodiment

Figure 3A:
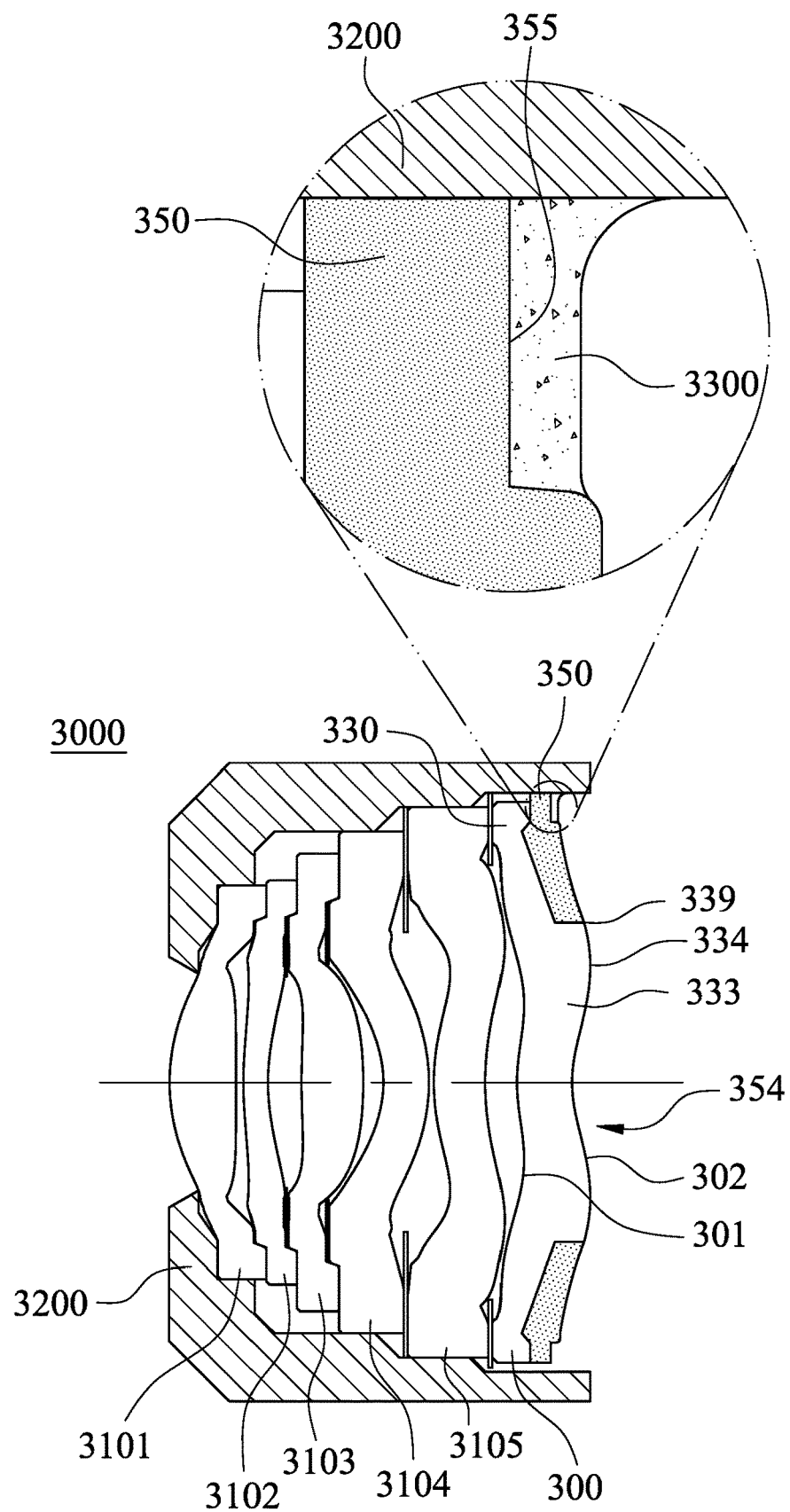
FIG. 3A is a schematic view of an imaging lens assembly according to the 3rd embodiment of the present disclosure.

FIG. 3A is a schematic view of an imaging lens assembly 3000 according to the 3rd embodiment of the present disclosure. In FIG. 3A, the imaging lens assembly 3000 includes a plurality of lens elements, wherein one of the lens elements is a dual molded lens element 300.

Figure 3B:
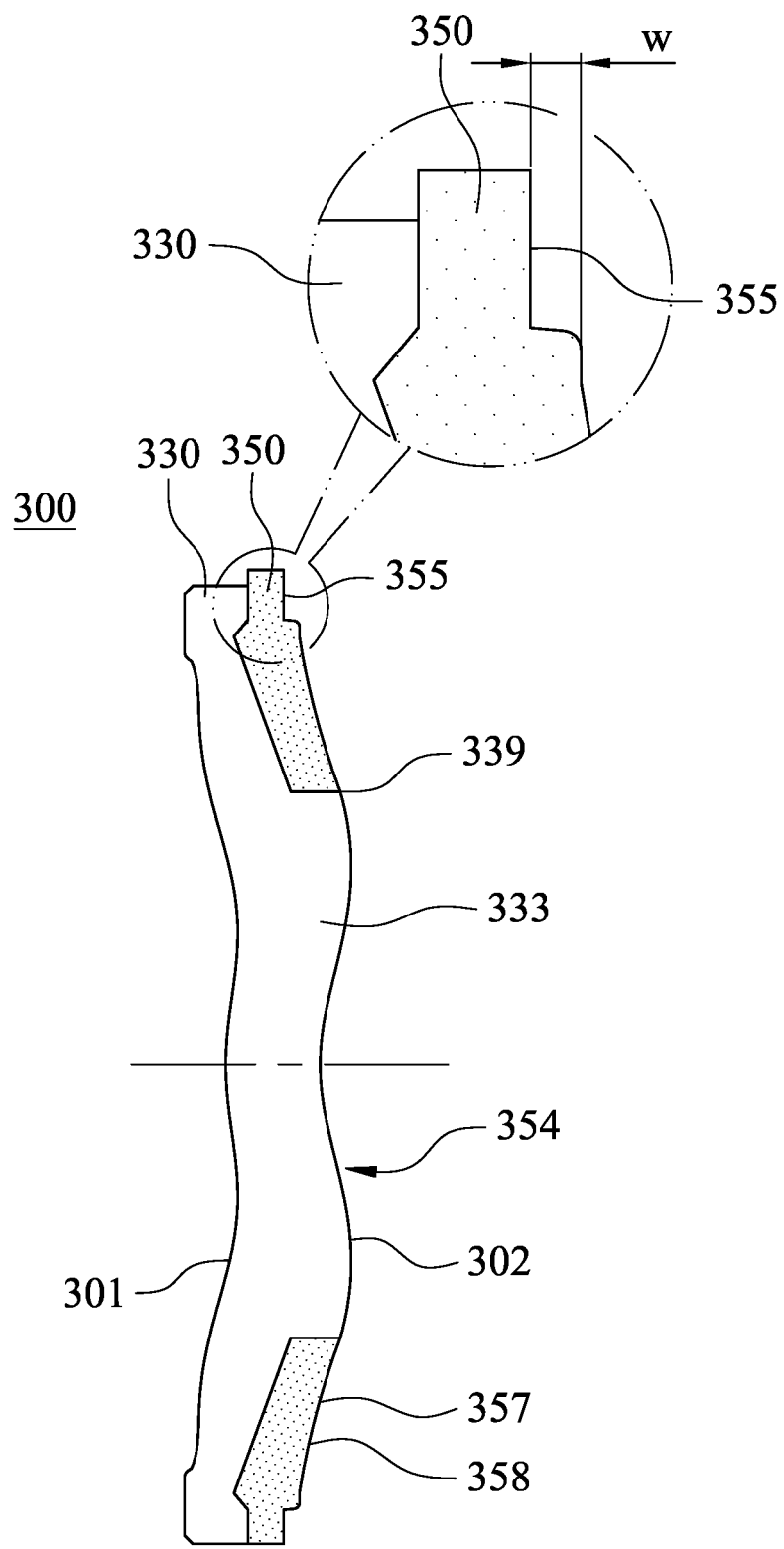
FIG. 3B is a schematic view of a dual molded lens element according to the 3rd embodiment.

FIG. 3B is a schematic view of the dual molded lens element 300 according to the 3rd embodiment. In FIG. 3A and FIG. 3B, the dual molded lens element 300 includes a light transmitting portion 330 and a light absorbing portion 350, wherein the light transmitting portion 330 and the light absorbing portion 350 of the dual molded lens element 300 are formed by a dual-shot injection molding method.

The light transmitting portion 330 includes an effective optical section 333, wherein an incident light passes through the effective optical section 333 and forms the image on an image surface (not shown herein).

The light absorbing portion 350 is located on one surface of an object-side surface 301 and an image-side surface 302 of the dual molded lens element 300 (the aforementioned surface is the image-side surface 302 in the 3rd embodiment). The plastic material of the light absorbing portion 350 has the feature of absorbing visible light, and the color of the light absorbing portion 350 is black. The plastic material of the light transmitting portion 330 has the feature of being transmitted by visible light, and the color of the light transmitting portion 330 is transparent and colorless. Hence, the plastic material and the color of the light absorbing portion 350 are different from the plastic material and the color of the light transmitting portion 330. The light absorbing portion 350 includes an opening 354, wherein the opening 354 is disposed correspondingly to the effective optical section 333.

Figure 3C:
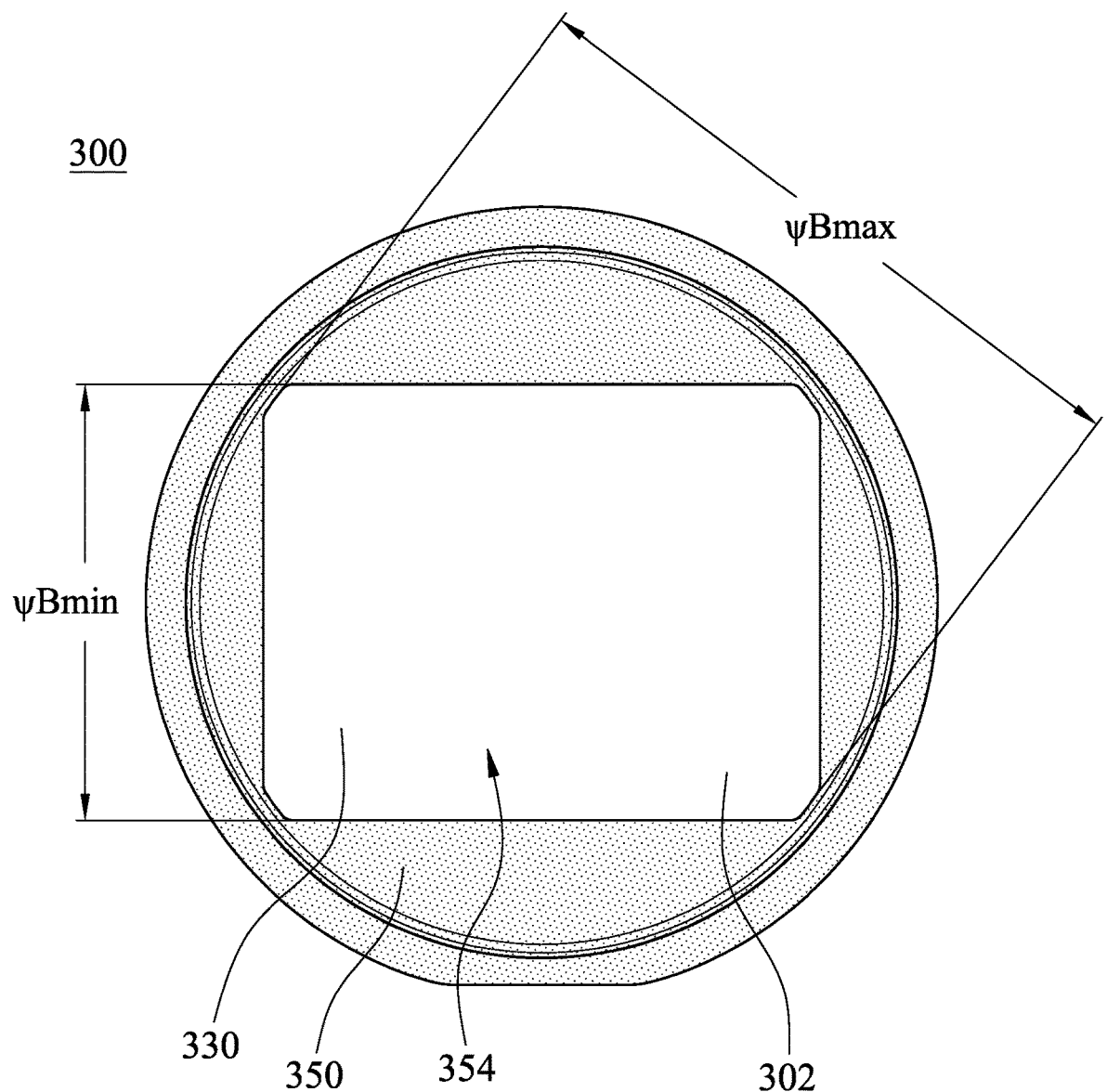
FIG. 3C is a top view of the dual molded lens element according to the 3rd embodiment.
Figure 3D:
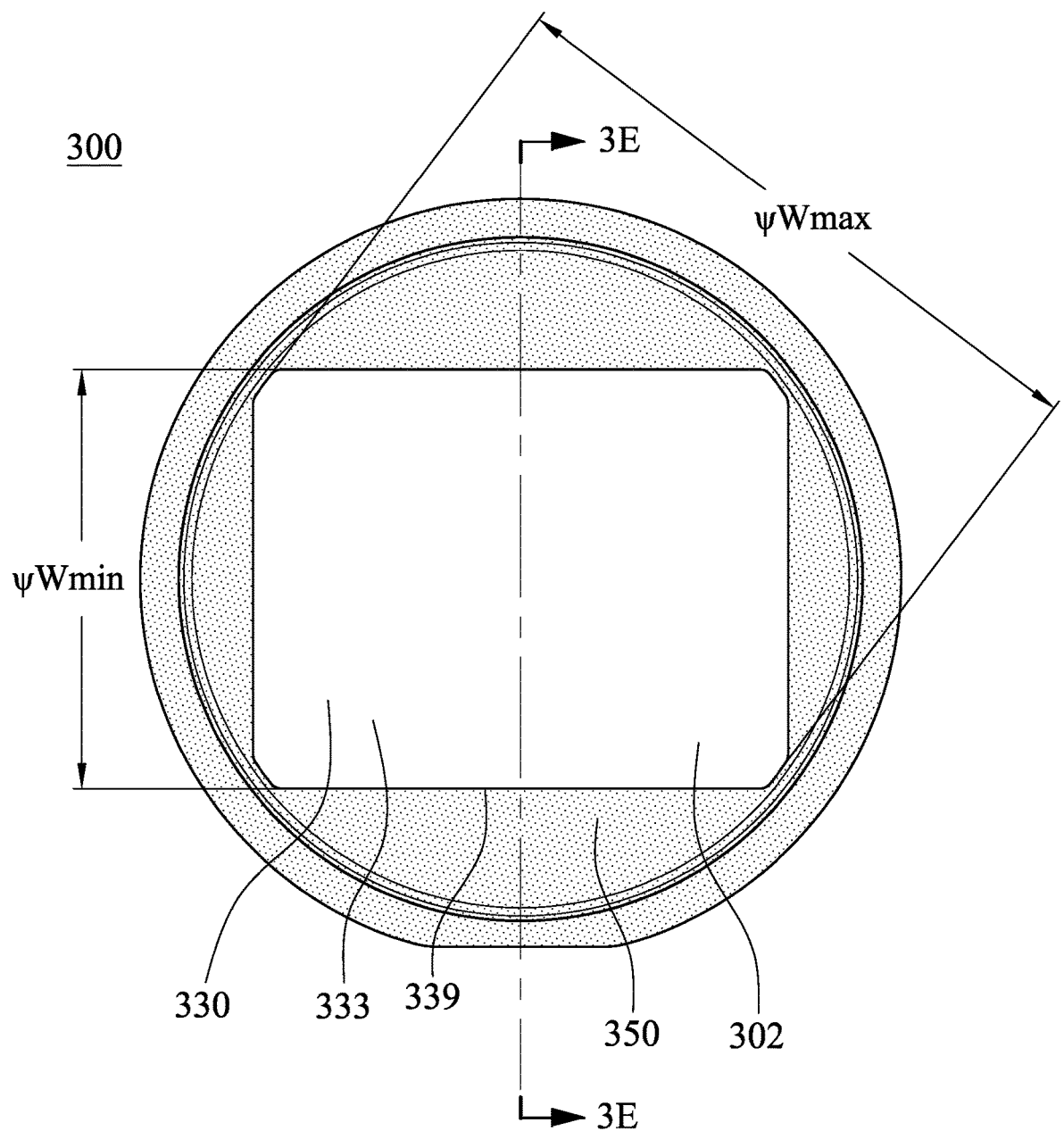
FIG. 3D is another top view of the dual molded lens element according to the 3rd embodiment.

In detail, FIG. 3C is a top view of the dual molded lens element 300 according to the 3rd embodiment, and FIG. 3D is another top view of the dual molded lens element 300 according to the 3rd embodiment. In FIG. 3C and FIG. 3D, the opening 354 of the light absorbing portion 350 is non-circular. The opening 354 is polygon. A number of sides of the opening 354 is eight. That is, the opening 354 is octagon.

A part of the effective optical section 333 located on the image-side surface 302 of the dual molded lens element 300 includes a non-circular outer edge 339. The opening 354 of the light absorbing portion 350 is disposed correspondingly to the non-circular outer edge 339 of the effective optical section 333, wherein an area enclosed by the non-circular outer edge 339 is completely overlapped by an area of the opening 354.

In FIG. 3A and FIG. 3B, the part of the effective optical section 333 located on the image-side surface 302 of the dual molded lens element 300 is aspheric. The part of the effective optical section 333 located on the image-side surface 302 of the dual molded lens element 300 includes at least one inflection point, wherein the image-side surface 302 is concave in a paraxial region thereof. The light absorbing portion 350 is located on the image-side surface 302 of the dual molded lens element 300, and a point 334 closest to the image surface of the effective optical section 333 is closer to the image surface than the light absorbing portion 350.

The imaging lens assembly 3000 includes, in order from an object side to an image side, the lens elements 3101, 3102, 3103, 3104, 3105 and the dual molded lens element 300. The imaging lens assembly 3000 has a total of six lens elements. The dual molded lens element 300 is closest to the image surface among the lens elements of the imaging lens assembly 3000.

The imaging lens assembly 3000 further includes a glue material 3300 connecting the light absorbing portion 350 and a barrel 3200. The light absorbing portion 350 further includes the ring-shaped recess structure 355 surrounding the opening 354. The ring-shaped recess structure 355 is recessed along a direction parallel to an optical axis from a surface of the light absorbing portion 350, which is located on the image-side surface 302 of the dual molded lens element 300. The ring-shaped recess structure 355 is adjacent to the barrel 3200, so that the glue material 3300 could connect the light absorbing portion 350 and the barrel 3200.

The light absorbing portion 350 further includes a rough surface 357, which is not in contact with the light transmitting portion 330. The light absorbing portion 350 further includes an anti-reflection coating 358 (not shown with a bold line as the anti-reflection coating 158 in the 1st embodiment). The anti-reflection coating 358 is coated on part area of a surface of the light absorbing portion 350, which is not in contact with the light transmitting portion 330.

Figure 3E:
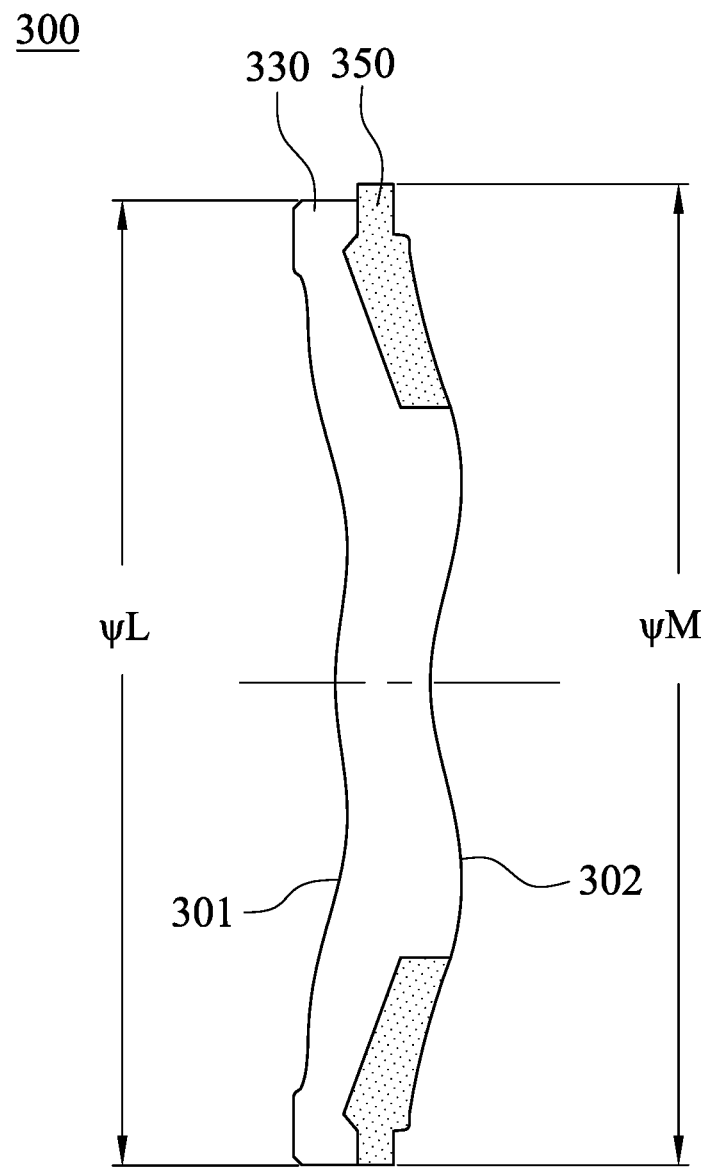
FIG. 3E is a cross-sectional view along line 3E-3E of FIG. 3D.

FIG. 3E is a cross-sectional view along line 3E-3E of FIG. 3D. The data of the parameters m, N, t, w, ψBmax, ψBmin, ψL, ψM, ψWmax, ψWmin, ψBmin/ψBmax, ψBmin/ψL and ψWmin/ψWmax of the imaging lens assembly 3000 according to the 3rd embodiment of the present disclosure are listed in the following Table 3, wherein the parameters are also shown as FIG. 3B to FIG. 3E. The definitions of these parameters shown in Table 3 are the same as those stated in the 1st embodiment with corresponding values for the 3rd embodiment.

TABLE 3

3rd Embodiment

| m | 8 | ψL (mm) | 5.70 |
|---|---|---|---|
| N | 6 | ψM (mm) | 5.79 |
| w (mm) | 0.09 | ψWmax (mm) | 5.00 |
| ψBmax (mm) | 5.00 | ψWmin (mm) | 3.25 |
| ψBmin (mm) | 3.25 | ψBmin/ψL | 0.57 |
| ψBmin/ψBmax | 0.65 | ψWmin/ψWmax | 0.65 |

4th Embodiment

Figure 4:
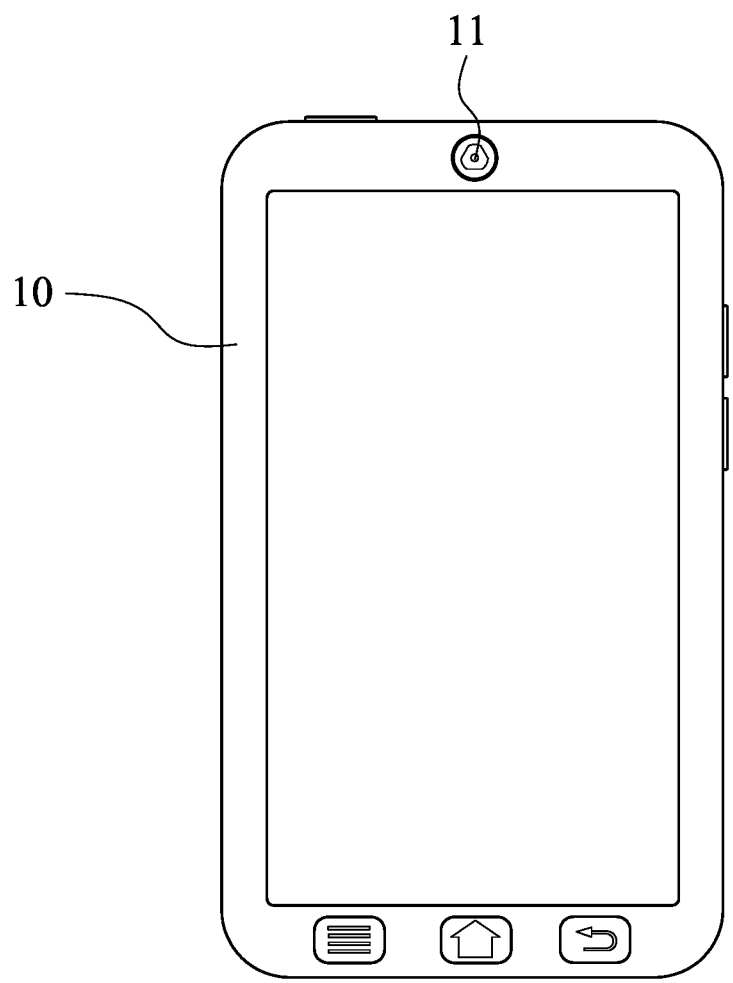
FIG. 4 shows an electronic device according to the 4th embodiment of the present disclosure.

FIG. 4 shows an electronic device 10 according to the 4th embodiment of the present disclosure. The electronic device 10 of the 4th embodiment is a smart phone, wherein the electronic device 10 includes an imaging lens module 11. The imaging lens module 11 includes an imaging lens assembly (not shown herein) according to the present disclosure. Therefore, it is favorable for improving the image quality so as to satisfy the requirements of high-end electronic devices with camera functionalities. Furthermore, the imaging lens module 11 can further include an image sensor (not shown herein) disposed on or near an image surface (not shown herein) of the imaging lens assembly. Preferably, the electronic device 10 can further include but not limited to a display, a control unit, a storage unit, a random access memory unit (RAM), a read-only memory unit (ROM) or a combination thereof.

5th Embodiment

Figure 5:
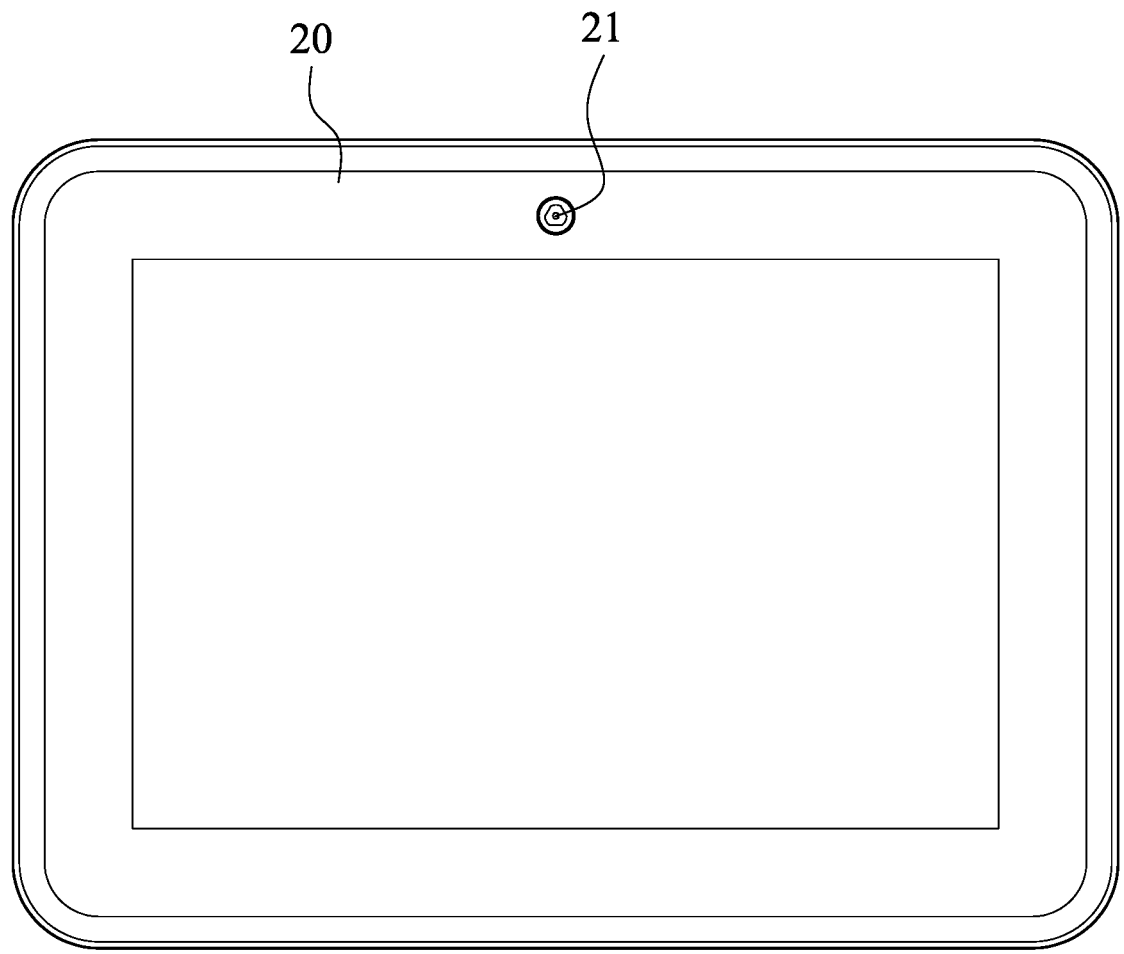
FIG. 5 shows an electronic device according to the 5th embodiment of the present disclosure.

FIG. 5 shows an electronic device 20 according to the 5th embodiment of the present disclosure. The electronic device 20 of the 5th embodiment is a tablet personal computer, wherein the electronic device 20 includes an imaging lens module 21. The imaging lens module 21 includes an imaging lens assembly (not shown herein) according to the present disclosure and an image sensor (not shown herein) disposed on or near an image surface (not shown herein) of the imaging lens assembly.

6th Embodiment

Figure 6:
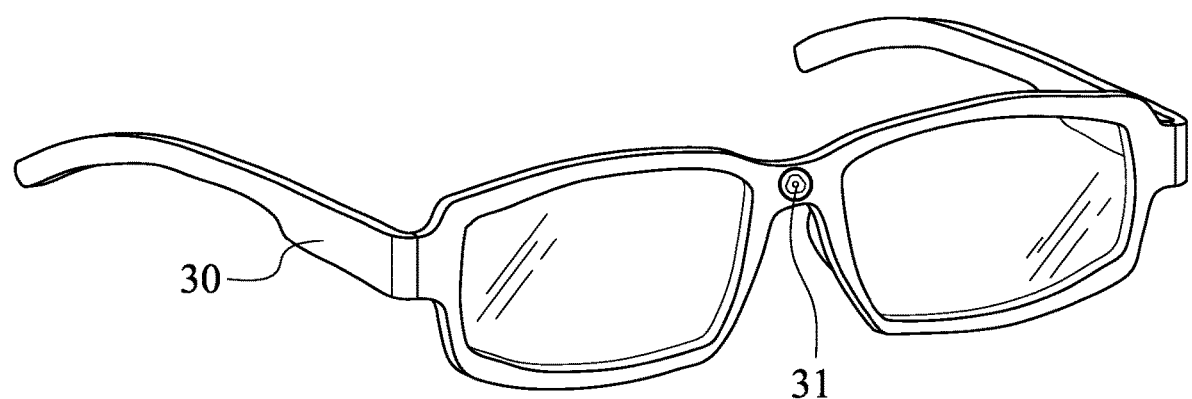
FIG. 6 shows an electronic device according to the 6th embodiment of the present disclosure.

FIG. 6 shows an electronic device 30 according to the 6th embodiment of the present disclosure. The electronic device 30 of the 6th embodiment is a wearable device, wherein the electronic device 30 includes an imaging lens module 31. The imaging lens module 31 includes an imaging lens assembly (not shown herein) according to the present disclosure and an image sensor (not shown herein) disposed on or near an image surface (not shown herein) of the imaging lens assembly.

Although the present disclosure has been described in considerable detail with reference to the embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the present disclosure. In view of the foregoing, it is intended that the present disclosure cover modifications and variations of this disclosure provided they fall within the scope of the following claims.

What is claimed is:

1. An imaging lens assembly, comprising a plurality of lens elements, wherein at least one of the lens elements is a dual molded lens element, and the dual molded lens element comprises:
    a light transmitting portion comprising:
    an effective optical section; and
    a light absorbing portion surrounding the effective optical section, wherein a plastic material and a color of the light absorbing portion are different from a plastic material and a color of the light transmitting portion, the light transmitting portion and the light absorbing portion are formed by a dual-shot injection molding method, and the light absorbing portion comprises:
    an opening, which is non-circular and disposed correspondingly to the effective optical section;
    wherein an outer periphery of the effective optical section facing an object side is circular and different from an outer periphery of the effective optical section facing an image side comprising a non-circular outer edge, and both of the outer periphery of the effective optical section facing the object side and the outer periphery of the effective optical section facing the image side are formed by the dual-shot injection molding method;
    wherein a minimum distance through an optical axis of the opening is $\psi Bmin$, a maximum distance through the optical axis of the opening is $\psi Bmax$, and the following condition is satisfied:

$$0.35 < \psi Bmin/\psi Bmax < 0.75.$$

2. The imaging lens assembly of claim 1, wherein the light absorbing portion further comprises:
    a ring-shaped recess structure, which is recessed along a direction parallel to the optical axis from a surface of the light absorbing portion.

3. The imaging lens assembly of claim 2, wherein a depth parallel to the optical axis of the ring-shaped recess structure is w, and the following condition is satisfied:

$$0.015 \text{ mm} < w < 0.35 \text{ mm}.$$

4. The imaging lens assembly of claim 1, wherein the light absorbing portion further comprises:
    a ring-shaped protrusion structure surrounding the opening.

5. The imaging lens assembly of claim 4, wherein a width along a radial direction of the optical axis of the ring-shaped protrusion structure is t, and the following condition is satisfied:

$$0.04 \text{ mm} < t < 0.80 \text{ mm}.$$

6. The imaging lens assembly of claim 1, wherein the opening is polygon.

7. The imaging lens assembly of claim 6, wherein a number of sides of the opening is m, and the following condition is satisfied:

$$3 < m < 13.$$

8. The imaging lens assembly of claim 1, wherein a part of the effective optical section, which is located on a surface of an object-side surface and an image-side surface of the dual molded lens element, is aspheric.

9. The imaging lens assembly of claim 8, wherein the light absorbing portion is located on the image-side surface of the dual molded lens element, and a point on the effective optical section of the image-side surface of the dual molded lens element closest to an image surface of the imaging lens assembly is closer to the image surface of the imaging lens assembly than the light absorbing portion.

10. The imaging lens assembly of claim 8, wherein the part of the effective optical section, which is located on the surface of the object-side surface and the image-side surface of the dual molded lens element, comprises at least one inflection point.

11. The imaging lens assembly of claim 1, wherein a maximum outer diameter of the light transmitting portion is $\psi L$, a maximum outer diameter of the light absorbing portion is $\psi M$, and the following condition is satisfied:

$$\psi L < \psi M.$$

12. The imaging lens assembly of claim 1, wherein the light absorbing portion further comprises:
    an anti-reflection coating coated on at least part of a surface of the light absorbing portion, which is not in contact with the light transmitting portion.

13. The imaging lens assembly of claim 1, wherein the dual molded lens element is closest to an image surface among the lens elements of the imaging lens assembly.

14. The imaging lens assembly of claim 13, further comprising:
    a glue material connected to the light absorbing portion.

15. The imaging lens assembly of claim 1, wherein an area enclosed by the non-circular outer edge is inside an area of the opening, a minimum distance through the optical axis of the non-circular outer edge is $\psi Wmin$, a maximum distance through the optical axis of the non-circular outer edge is ψWmax, and the following condition is satisfied:

$$0.35 < \psi Wmin/\psi Wmax < 0.75.$$

16. An electronic device, comprising:
an imaging lens module comprising:
the imaging lens assembly of claim 1; and
an image sensor, wherein the image sensor is disposed on an image surface of the imaging lens assembly.

* * * * *